(12) United States Patent
Temma

(10) Patent No.: US 12,722,525 B2
(45) Date of Patent: Sep. 1, 2026

(54) CONTROL SYSTEM FOR ELECTRIC VEHICLE

(71) Applicant: ISUZU MOTORS LIMITED, Yokohama (JP)

(72) Inventor: Yuki Temma, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 19/057,164

(22) Filed: Feb. 19, 2025

(65) Prior Publication Data

US 2025/0332949 A1 Oct. 30, 2025

(30) Foreign Application Priority Data

Apr. 30, 2024 (JP) ................................ 2024-073937

(51) Int. Cl.
*B60L 53/80* (2019.01)
*B60R 25/04* (2013.01)

(52) U.S. Cl.
CPC ............. *B60L 53/80* (2019.02); *B60R 25/04* (2013.01)

(58) Field of Classification Search
CPC ................................ B60L 53/80; B60R 25/04
USPC ........................................................ 701/22
See application file for complete search history.

(56) References Cited

U.S. PATENT DOCUMENTS 8,511,121 B2 * 8/2013 Tsuruta ................ B60R 25/243 70/389
12,017,622 B1 * 6/2024 Mireles .............. H01M 50/244
2020/0148073 A1 * 5/2020 Sasu ....................... B60L 58/27
2022/0212638 A1 * 7/2022 Georgeson ............... G05D 1/12
2024/0348438 A1 * 10/2024 Hoshi ..................... H04L 9/088
2025/0074179 A1 3/2025 Osawa et al.
2025/0332947 A1 * 10/2025 Migita ................... B60L 53/80

FOREIGN PATENT DOCUMENTS

DE 102024124639 A1 3/2025
GB 2639001 A * 9/2025 ............. B60L 58/12
JP 2000-225923 A 8/2000
JP 2011-131805 A 7/2011
JP 2016-203937 A 12/2016
JP 7632539 B 2/2025
WO WO-2016173949 A1 * 11/2016 ............ B60L 3/0046
WO WO-2017106104 A1 * 6/2017 .......... H01M 50/249

OTHER PUBLICATIONS

Pier et al., "Economic Payback Time of Battery Pack Replacement for Hybrid and Plug-In Hybrid Electric Vehicles," 2023, vol. 9, Publisher: IEEE.*

* cited by examiner

*Primary Examiner* — Tuan C To
(74) *Attorney, Agent, or Firm* — Shih IP Law Group, PLLC

(57) ABSTRACT

Control system Cu for electric vehicle C according to the present disclosure includes: key cylinder 102; key-lock function ECU 202; battery replacement switch 101; and battery replacement function ECU 201, in which battery replacement function ECU 201 switches key cylinder 102 from an unlocked state to a locked state when a replacement command for battery 11 is received, and maintains the locked state of key cylinder 102 from a start to an end of a replacement procedure of battery 11, and switches key cylinder 102 from the locked state to the unlocked state, upon the end of the replacement procedure of battery 11 as a trigger.

4 Claims, 8 Drawing Sheets

CONTROL SYSTEM FOR ELECTRIC VEHICLE

TECHNICAL FIELD

The present disclosure relates to a control system for an electric vehicle.

BACKGROUND ART

Conventionally, electric vehicles (for example, electric automobiles and electric scooters) equipped with batteries are known.

In recent years, there has been an increasing number of cases where an electric vehicle of this type is equipped with a battery replacement system. Such a battery replacement system is generally designed based on the concept of replacing a battery, when the storage power of the battery mounted on the vehicle has decreased, with another battery that has been fully charged at a battery replacement station, instead of charging the battery each time (see, for example, Patent Literature (hereinafter referred to as "PTL") 1).

In this type of battery replacement system, the operation of a lock mechanism (for example, see FIGS. 3 and 4 to be described later) that supports and fixes a battery to a vehicle frame is controlled under the control of an electronic control unit (ECU), and the battery is removed from the vehicle frame and/or attached to the vehicle frame. At this time, the ECU establishes communication with a battery replacement station and, in cooperation with a battery replacement machine of the battery replacement station, causes the battery replacement machine to perform replacement of the battery mounted on the vehicle.

CITATION LIST

Patent Literature

PTL 1
Japanese Patent Application No. 2023-134543
PTL 2
Japanese Patent Application Laid Open No. 2000-225923

SUMMARY OF INVENTION

Technical Problem

Incidentally, this type of battery replacement system is currently under development, and has not yet reached the stage of identifying various problems that may arise during an actual use of a vehicle and optimizing the entire control system of the vehicle.

In such a background, the inventor of the present application has conceived a problem in that, in a situation where a vehicle is actually used, there is a possibility that a driver may perform a vehicle activation operation (that is, an ignition switch ON operation in a key cylinder) during battery replacement. In such a case, upon receiving a vehicle activation command from the key cylinder, a system main relay in an electrical circuit that connects the battery and a drive motor of the vehicle is brought into an on state, and a high voltage generated at a terminal portion of the battery is applied to a battery connector on a vehicle side in a non-connected state, which may cause arc discharge. As a result, situations may occur the battery connector becomes welded or other components are damaged.

Note that the system main relay is disposed, for example, in an output portion on a battery side, and is designed to be brought into an on state in order to make the vehicle ready for traveling when a vehicle activation operation is performed.

Further, when the vehicle activation operation is performed during the battery replacement, the ECU will notify the battery replacement station of an emergency stop command for a battery replacement procedure to avoid danger. As a result, there is a risk of unnecessarily redoing the battery replacement procedure or inducing an operation failure in the battery replacement machine of the battery replacement station.

An object of the present disclosure, which has been conceived in view of these problems, is to provide a control system for an electric vehicle capable of preventing a situation in which a vehicle activation operation is performed during battery replacement.

Principally, the present invention that solves the aforementioned problem is a control system for an electric vehicle equipped with a battery, the control system including:

- a key cylinder that functions as an ignition switch of the electric vehicle;
- a key-lock control section that performs switching control between a locked state and an unlocked state of the key cylinder;
- a battery replacement switch that receives a replacement command for the battery; and
- a battery replacement control section that, during replacement of the battery, communicates with a battery replacement station outside the electric vehicle, controls a replacement procedure of the battery, and operates in cooperation with the key-lock control section,
- in which the battery replacement control section:
  - switches the key cylinder from the unlocked state to the locked state when the replacement command for the battery is received by the battery replacement switch, and
  - maintains the locked state of the key cylinder from a start to an end of the replacement procedure of the battery, and switches the key cylinder from the locked state to the unlocked state, upon the end of the replacement procedure of the battery as a trigger.

Advantageous Effects of Invention

According to a control system for an electric vehicle of the present invention, it is possible to prevent a situation in which a vehicle activation operation is performed during battery replacement.

DESCRIPTION OF EMBODIMENTS

Figure 1:
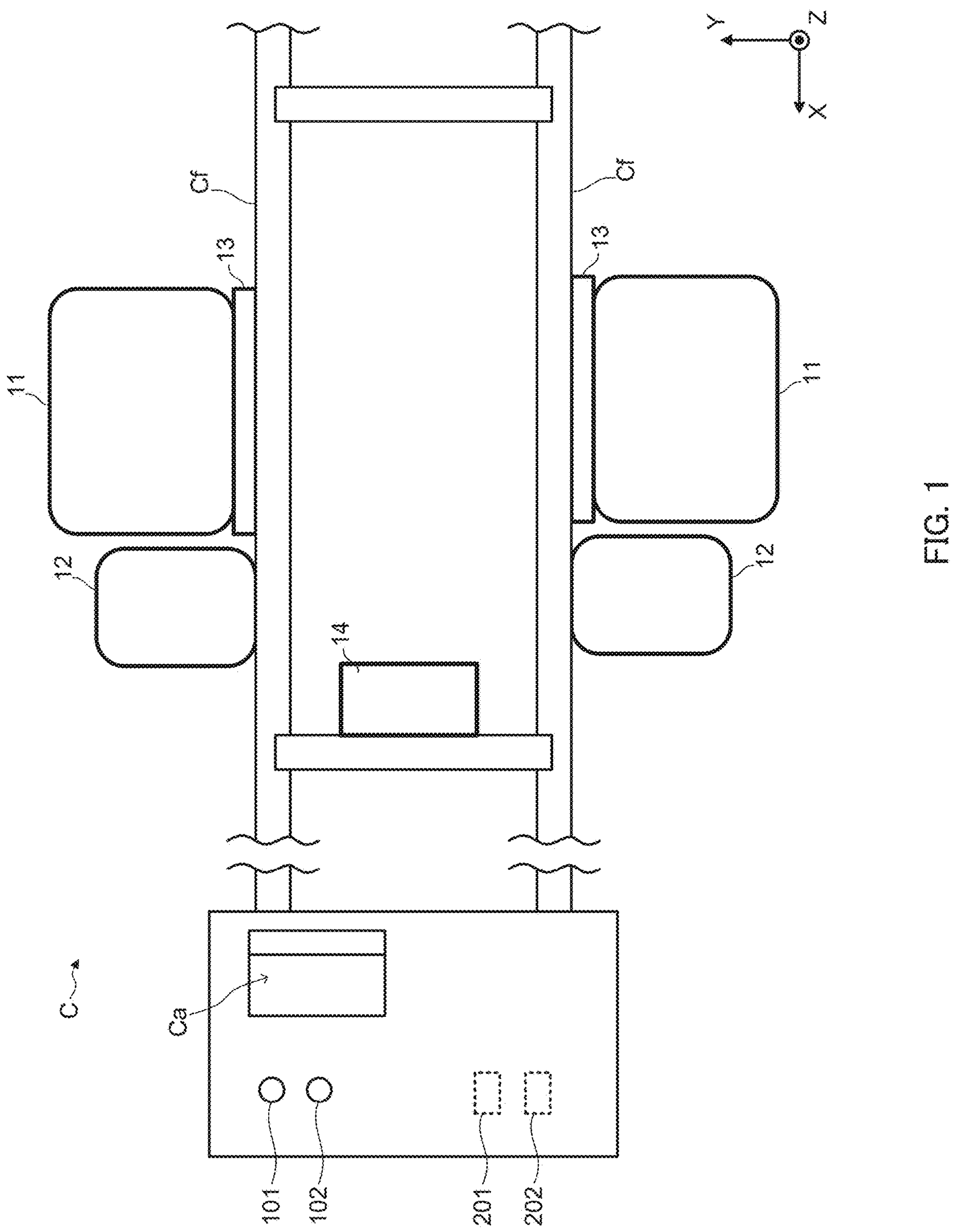
FIG. 1 illustrates an exemplary configuration of a vehicle (plan view)

A preferred embodiment of the present disclosure will be described in detail with reference to the attached drawings. Note that elements having substantially the same functions are assigned the same reference numerals in the description and drawings to omit duplicated descriptions thereof.

Hereinafter, exemplary configurations of an electric vehicle (hereinafter, referred to as "vehicle C") and a control system for vehicle C (hereinafter, referred to as "control system Cu") according to an embodiment of the present invention will be described.

In the present embodiment, a battery replacement function of control system Cu will be mainly described. Here, a battery to be replaced in control system Cu is, for example, mounted on an electric vehicle such as an electric automobile or a hybrid automobile and is used as a drive power source for the vehicle (hereinafter, also referred to as a "main battery").

<Overall Configuration of Vehicle>

Figure 2:
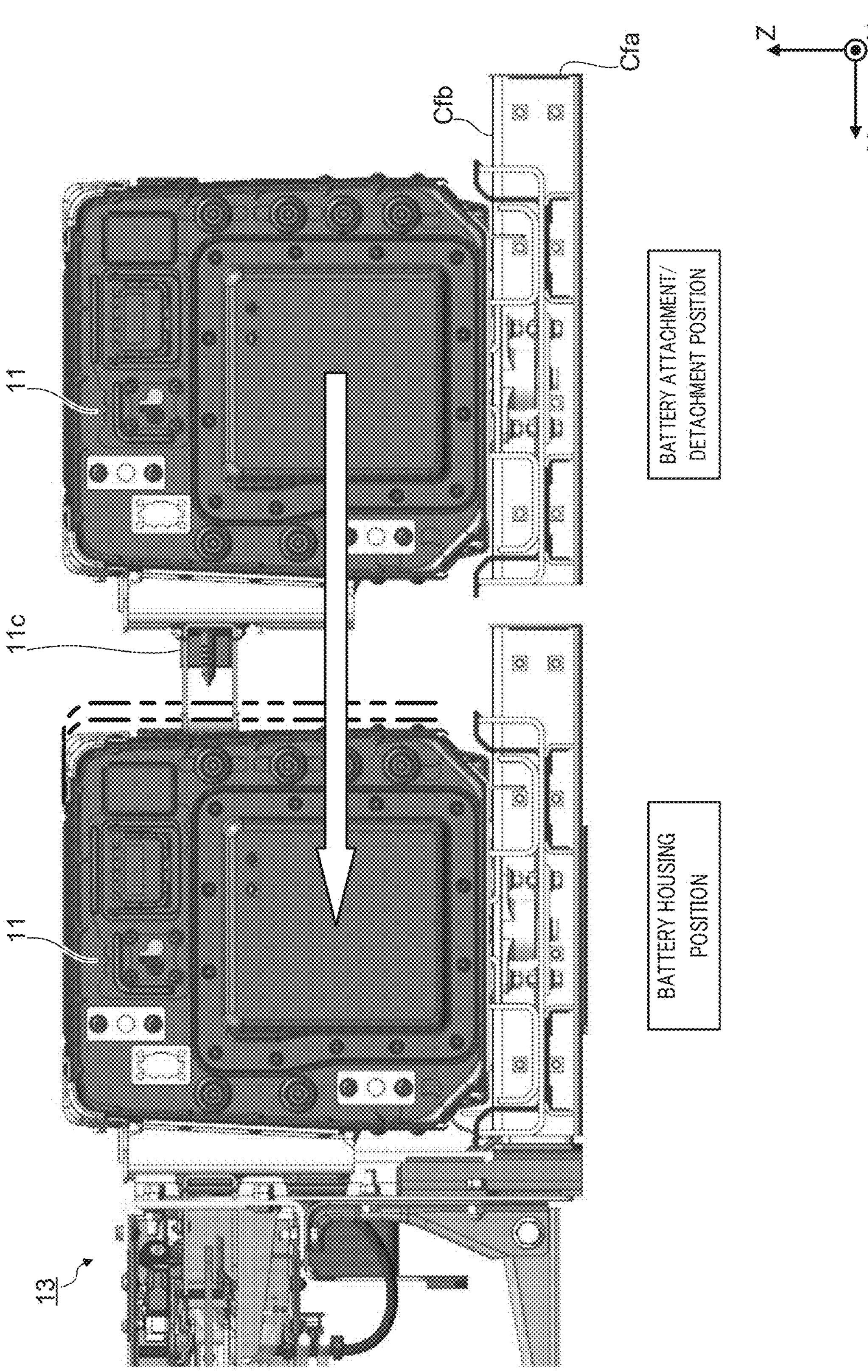
FIG. 2 illustrates an exemplary mode of attaching a main battery to the vehicle.

FIG. 1 illustrates an exemplary configuration of vehicle C (plan view). FIG. 2 illustrates an exemplary mode of attaching main battery 11 to vehicle C.

Figure 3:
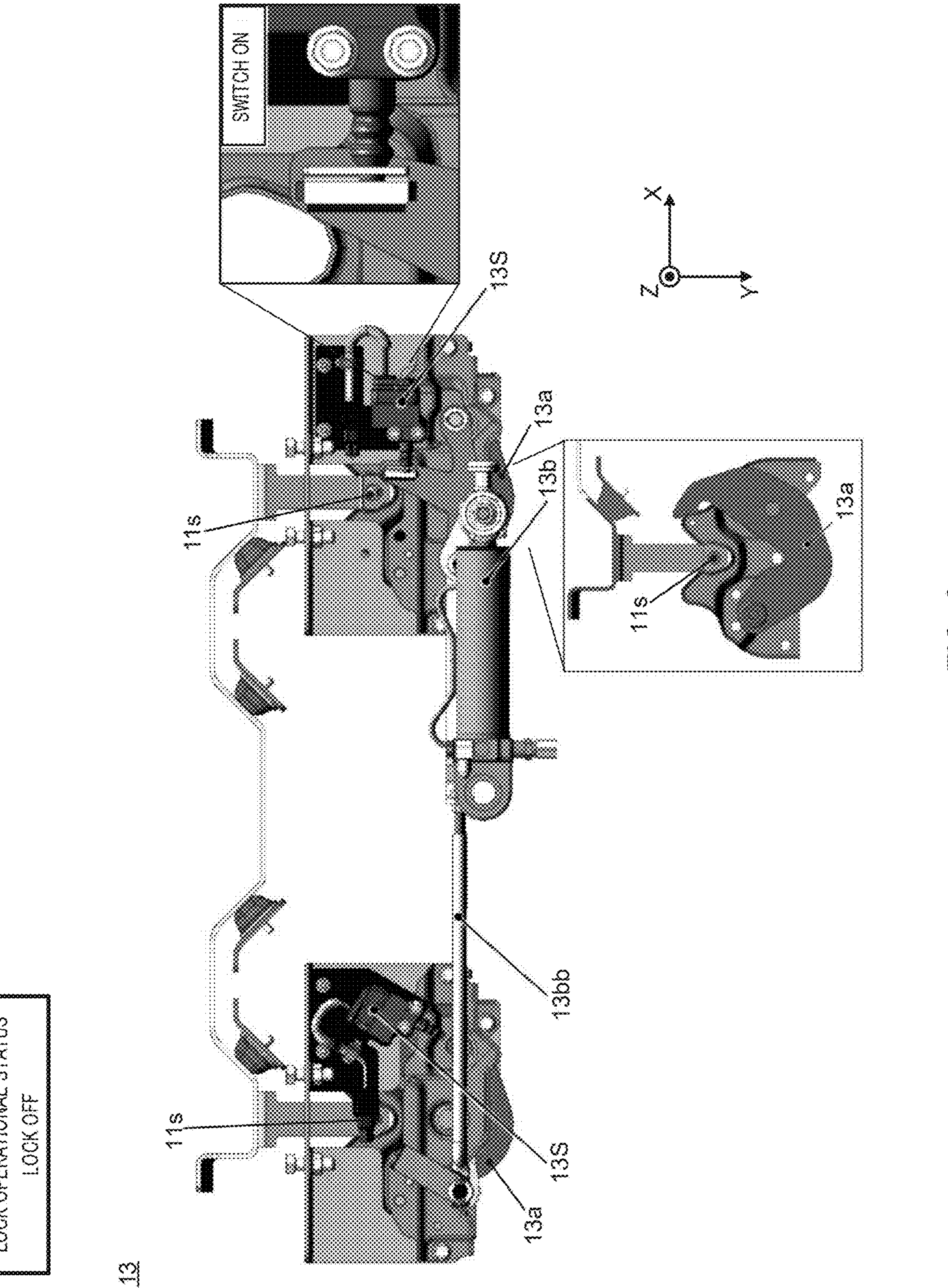
FIG. 3 illustrates an exemplary configuration of a lock mechanism for fixing the main battery to the vehicle (unlocked state)
Figure 4:
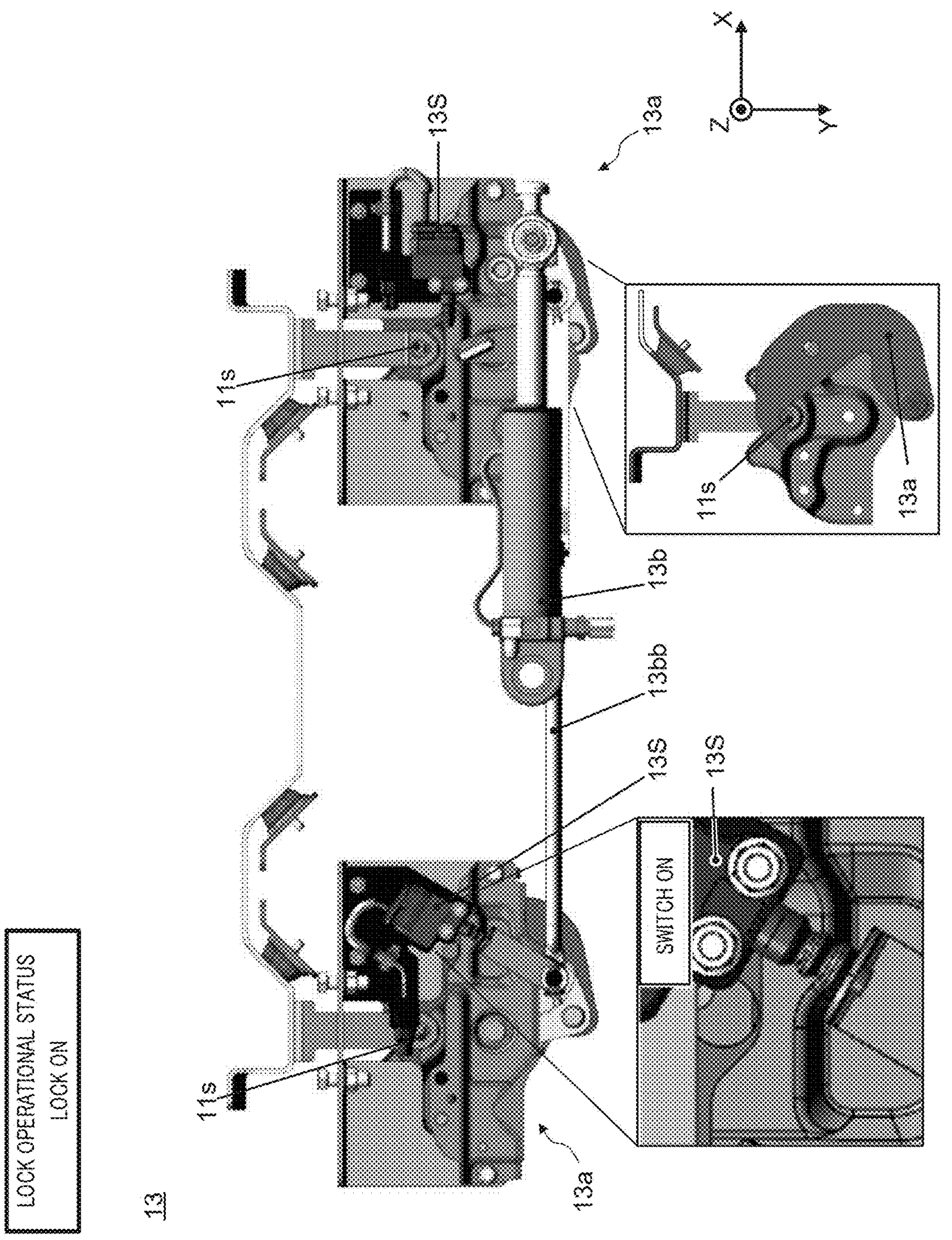
FIG. 4 illustrates another exemplary configuration of the lock mechanism for fixing the main battery to the vehicle (locked state)

FIGS. 3 and 4 each illustrate an exemplary configuration of lock mechanism 13 that fixes main battery 11 to vehicle C (plan view). FIG. 3 illustrates an unlocked state of lock mechanism 13, and FIG. 4 illustrates a locked state of lock mechanism 13.

Figure 5:
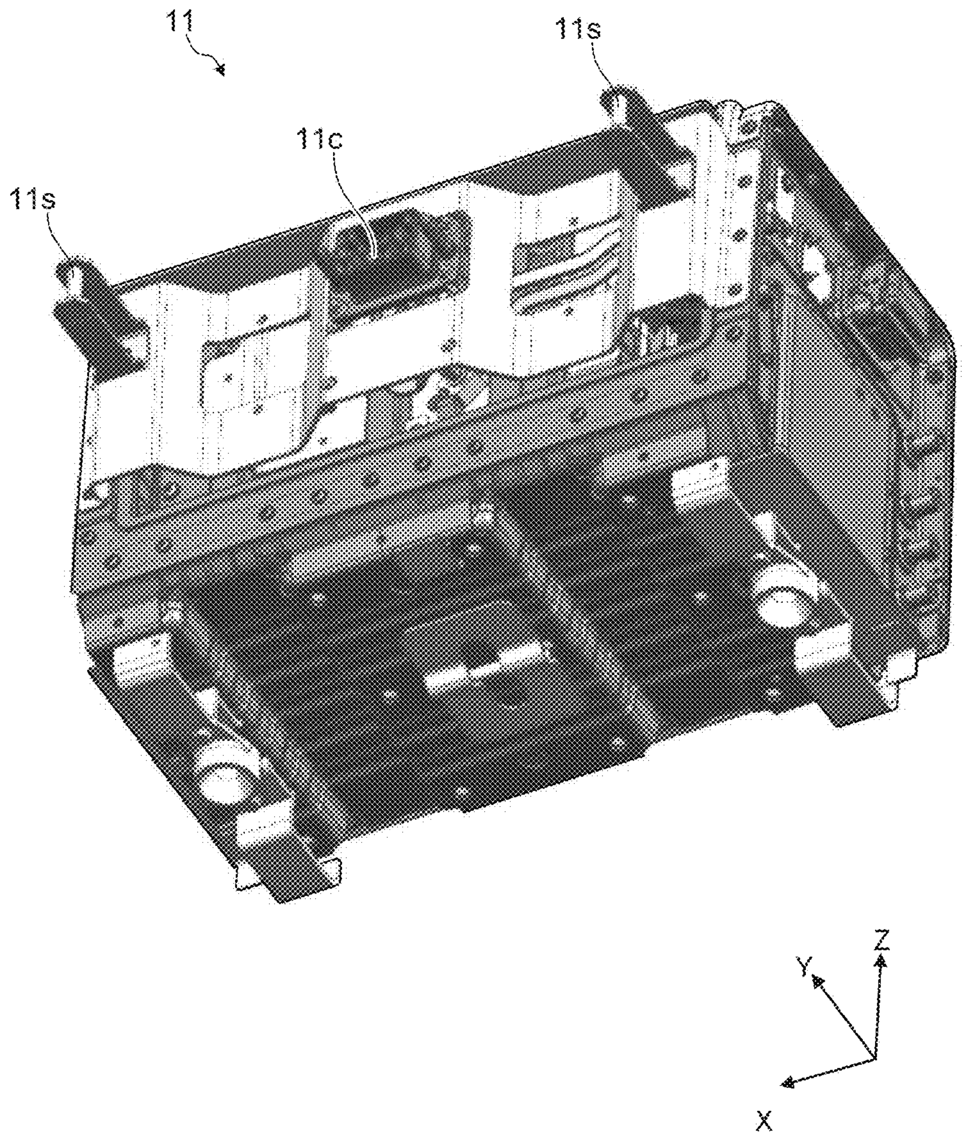
FIG. 5 illustrates an appearance of the main battery.
Figure 6:
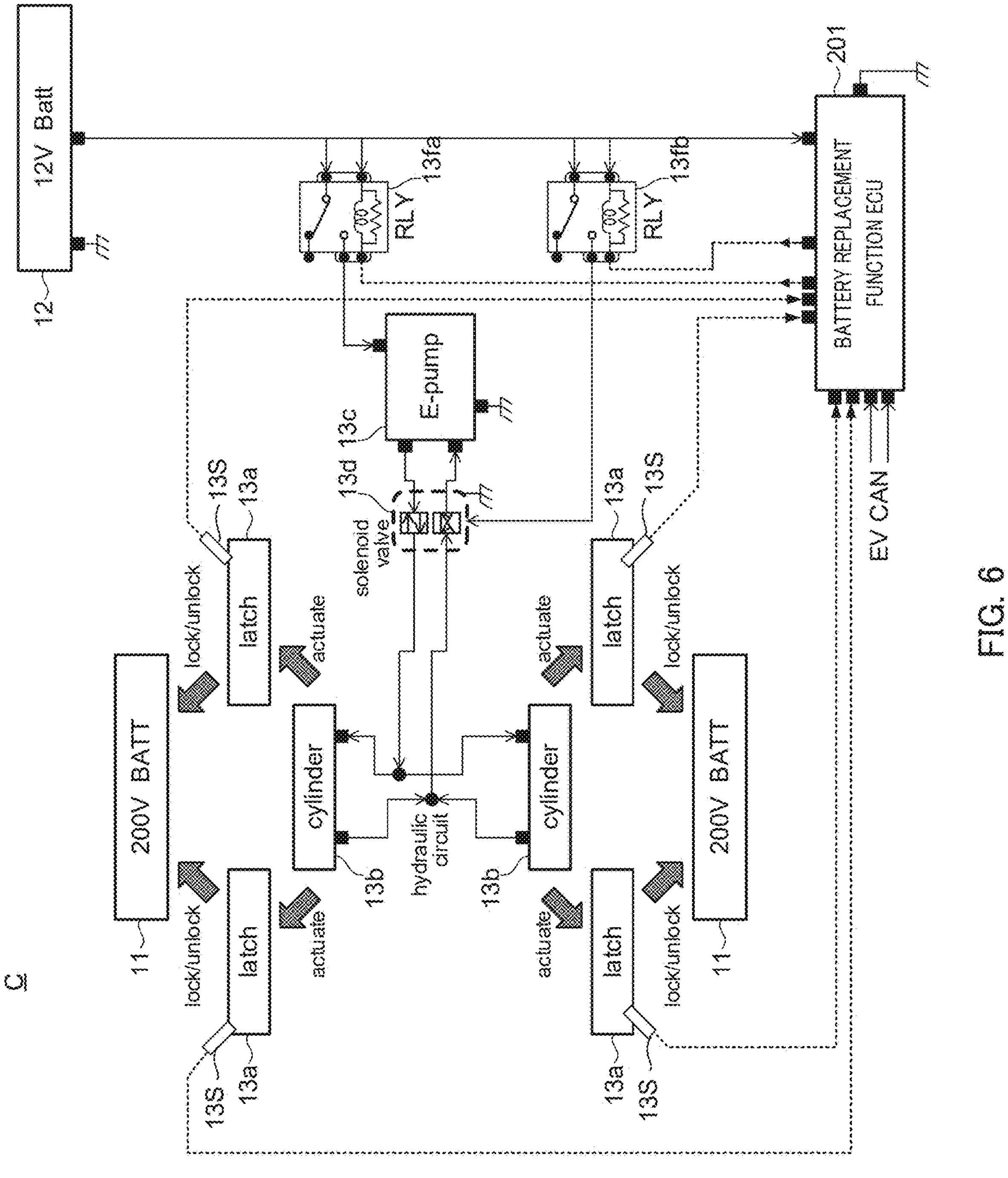
FIG. 6 illustrates an exemplary drive mechanism of the lock mechanism.

FIG. 5 illustrates an appearance of main battery 11. FIG. 6 illustrates an exemplary drive mechanism of lock mechanism 13.

Vehicle C is a vehicle, such as an electric automobile or a hybrid vehicle, which can travel using the drive power source of main battery 11. FIG. 1 illustrates, as an example, a configuration of a large-sized vehicle such as a truck. Note that vehicle frame Cf of vehicle C extends along a front-rear direction of the vehicle, is disposed on each side of left and right of the vehicle, and supports a vehicle body and various on-board devices. Further, vehicle frame Cf supports a cab that forms driver-seat Ca at a front portion of vehicle C. Vehicle frame Cf is formed of, for example, a steel bone material having a U-shaped cross section.

Vehicle C includes main battery 11, auxiliary battery 12, lock mechanism 13, drive motor 14, battery replacement switch 101, key cylinder 102, battery replacement function ECU 201, and key-lock function ECU 202.

Main battery 11 is a high-voltage battery that supplies an operational power for driving vehicle C to drive motor 14. In the present embodiment, a battery pack of a 300 V class lithium-ion battery is used as main battery 11, for example.

Main battery 11 is detachably attached to a side-surface portion of vehicle frame Cf via lock mechanism 13. In the present embodiment, main battery 11 is attached to each of left-side vehicle frame Cf and right-side vehicle frame Cf.

Note that main battery 11 includes terminal portion 11*c* on a side surface, and is electrically connectable to a battery connector (not illustrated) on a vehicle C side via terminal portion 11*c*. Further, main battery 11 includes striker 11*s* that is rod-shaped for engaging with latch 13*a* of lock mechanism 13 (see FIG. 5).

As illustrated in FIG. 2, vehicle frame Cf includes placing table Cfb on which main battery 11 is placed and slide rail base Cfa that slidably supports placing table Cfb. Slide rail base Cfa is attached to an outer-side surface of vehicle frame Cf and extends in a horizontal direction from vehicle frame Cf toward a laterally outside of vehicle C. Further, slide rail base Cfa guides placing table Cfb to be slidable between a battery housing position and a battery attachment/detachment position in vehicle C.

FIG. 2 illustrates a state in which placing table Cfb is slid to the battery housing position from a state in which placing table Cfb is drawn out to the battery attachment/detachment position.

In vehicle C according to the present embodiment, when main battery 11 is to be housed in vehicle C, main battery 11 is placed on placing table Cfb when placing table Cfb is in the battery attachment/detachment position. Main battery 11 is then slid on slide rail base Cfa under a state of being placed on placing table Cfb, and is guided from the battery attachment/detachment position to the battery housing position. Main battery 11 is thus locked to vehicle frame Cf at the battery housing position using lock mechanism 13. At this time, terminal portion 11*c* of main battery 11 is connected to the battery connector on the vehicle C side, thereby completing the housing of main battery 11 in vehicle C.

In vehicle C according to the present embodiment, when main battery 11 is to be removed from vehicle C, for example, lock mechanism 13 is driven to release the locked state of main battery 11 to vehicle frame Cf. Main battery 11 is then slid by slide rail base Cfa under a state of being placed on placing table Cfb, and is guided from the battery housing position in vehicle C to the battery attachment/detachment position. Main battery 11 is thus, for example, lifted by a battery replacement machine of a battery replacement station at the battery attachment/detachment position and is removed from vehicle C.

Note that, for an example of the operation of the battery replacement machine of the battery replacement station, reference to, for example, PTL 1 of the related application by the applicant of the present application is encouraged.

Auxiliary battery 12 is a low-voltage battery that supplies an operational power to the on-board electrical components. Auxiliary battery 12 is, for example, a 12V lead-acid battery. Auxiliary battery 12 is fixed to a side-surface portion of vehicle frame Cf. In vehicle C according to the present embodiment, for example, an ECU (for example, battery replacement function ECU 201 and key-lock function ECU 202 to be described later) and lock mechanism 13 operate with the power supplied from auxiliary battery 12 (see FIG. 6).

Lock mechanism 13 is fixed to vehicle frame Cf and attaches main battery 11 to vehicle frame Cf in a detachable manner (see FIGS. 3, 4, and 6). Note that, in FIGS. 3 and 4, main battery 11 is not illustrated, and only striker 11*s* attached to a side surface of main battery 11 is illustrated.

Lock mechanism 13 according to the present embodiment is configured to include latch 13*a*, hydraulic cylinder 13*b*, drive pump 13*c*, control valve 13*d*, first relay 13*fa*, and second relay 13*fb*.

Latches 13*a* are provided in a pair along a front-rear direction of vehicle frame Cf. Each of the pair of latches 13*a* is rotatably supported around a vertical axis with respect to a bracket attached to vehicle frame Cf. Each of the pair of latches 13*a* is a hook member that extends from an inside to an outside of vehicle frame Cf and is caught by striker 11*s* that is rod-shaped. Then, each of the pair of latches 13*a* rotates around the vertical axis in conjunction with the operation of hydraulic cylinder 13*b*.

That is, when locking main battery 11 to vehicle frame Cf, each of the pair of latches 13*a* rotates to one side around the vertical axis, engages with striker 11*s* attached to main battery 11, and thereby fixes main battery 11 to vehicle frame Cf. Meanwhile, when unlocking main battery 11 from vehicle frame Cf, each of the pair of latches 13*a* rotates to the other side around the vertical axis, releases the engaged state with striker 11*s* of main battery 11, and makes main battery 11 detachable from vehicle frame Cf.

Lock mechanism 13 typically holds the locked state in which main battery 11 is fixed to vehicle frame Cf when main battery 11 is to be housed in vehicle C. Further, lock mechanism 13 releases the locked state between main battery 11 and vehicle frame Cf when main battery 11 is replaced.

Note that, in the present embodiment, one side of the pair of latches 13*a* is directly connected to hydraulic cylinder 13*b*, and the other side of the pair of latches 13*a* is connected to hydraulic cylinder 13*b* via rod 13*bb*. Further, each of the pair of latches 13*a* is provided with contact sensor 13S, which can detect whether the locked state is established. Sensor signals from contact sensors 13S are transmitted to battery replacement function ECU 201, and battery replacement function ECU 201 is configured to detect malfunctions or other issues in lock mechanism 13, based on these sensor signals.

Hydraulic cylinder 13*b* is connected to a hydraulic circuit, and changes in state depending on operation states of drive pump 13*c*, which supplies hydraulic oil to the hydraulic circuit, and control valve 13*d*, which is disposed in the hydraulic circuit. That is, drive pump 13*c* sends high-pressure hydraulic oil to the hydraulic circuit, and control valve 13*d* controls a supply state of the hydraulic oil to hydraulic cylinder 13*b*. Thus, hydraulic cylinder 13*b* converts fluid energy of the hydraulic oil into mechanical energy to move the pair of latches 13*a*.

The operation state of hydraulic cylinder 13*b* is controlled by battery replacement function ECU 201 that controls drive pump 13*c* and control valve 13*d*. To be more specific, battery replacement function ECU 201 controls the operation of drive pump 13*c* by performing on/off control of first relay 13*fa* disposed in a line connecting between drive pump 13*c* and auxiliary battery 12 that supplies an operational power to drive pump 13*c*. Similarly, battery replacement function ECU 201 controls the operation of control valve 13*d* by performing on/off control of second relay 13*fb* disposed in a line connecting between control valve 13*d* and auxiliary battery 12 that supplies an operational power to control valve 13*d*.

Battery replacement function ECU 201 is, for example, a microcontroller configured to include a central processing unit (CPU), a read only memory (ROM), a random access memory (RAM), an input port, an output port, a communication module, and the like.

Battery replacement function ECU 201 operates lock mechanism 13 to switch between the locked state and the unlocked state of main battery 11 with respect to vehicle frame Cf. Further, battery replacement function ECU 201 is configured to be capable of communicating with the battery replacement station, and executes the replacement procedure of main battery 11 in cooperation with the battery replacement station.

<Control System for Vehicle>

Figure 7:
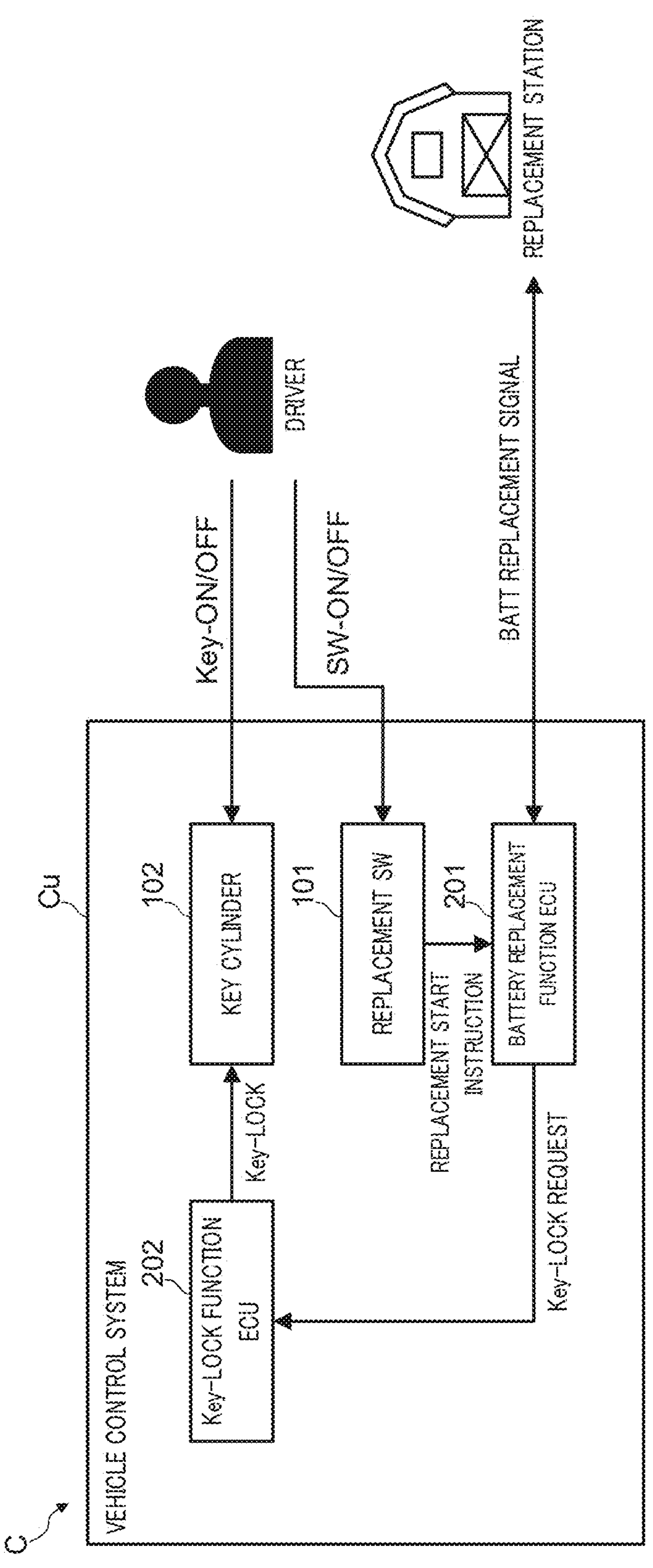
FIG. 7 illustrates an exemplary configuration of a control system for the vehicle.

FIG. 7 illustrates an exemplary configuration of control system Cu for vehicle C. Note that FIG. 7 illustrates only the configuration related to the key control function and the battery replacement function of vehicle C.

As described above, vehicle C includes key cylinder 102, key-lock function ECU 202, battery replacement switch 101, and battery replacement function ECU 201. Note that key cylinder 102 and battery replacement switch 101 are disposed, for example, on an instrument panel in front of driver seat Ca of vehicle C.

Note that, a "key-lock control section" in the present invention corresponds to key-lock function ECU 202, and a "battery replacement control section" corresponds to battery replacement function ECU 201.

Key cylinder 102 is, for example, a key cylinder that functions as an ignition switch and is configured integrally with the ignition switch of vehicle C. Key cylinder 102 has the same configuration as a conventionally publicly-known key cylinder. That is, key cylinder 102 receives a key for vehicle C held by a driver, and when an operation of rotating a rotor of key cylinder 102 to a vehicle activation specified position is performed with the key, the built-in ignition switch is turned on. Key cylinder 102 transmits a vehicle activation command to each component (for example, a system main relay and vehicle ECU, neither is illustrated) when the ignition switch is brought into an on state.

Further, key cylinder 102 includes a key-lock mechanism and is configured to allow key-locking in a key-off state (that is, ignition switch OFF). The key-lock mechanism has the same configuration as a conventionally publicly-known key-lock mechanism. The key-lock mechanism is configured of, for example, a solenoid and a restricting member that is operated by the solenoid. Then, during the key-locking, the key-lock mechanism operates the restricting member with the solenoid to restrict rotation of the rotor of key cylinder 102, thereby preventing the ignition switch from being turned on.

Note that the configurations of key cylinder 102 and the key-lock mechanism are the same as the configurations of a key cylinder and a key-lock mechanism, which are conventionally publicly-known, and reference to PTL 2 is encouraged, for example.

Key-lock function ECU 202 operates the key-lock mechanism of key cylinder 102 to perform switching control between a locked state and an unlocked state of key cylinder 102.

Note that key-lock function ECU 202 is, for example, a microcontroller configured to include a CPU, a ROM, a RAM, an input port, and an output port.

Battery replacement switch 101 receives a battery replacement command operation (refers to a replacement command operation for main battery 11; the same applies hereinafter) from the user. When receiving the battery replacement command operation from the user, battery replacement switch 101 transmits the replacement command to battery replacement function ECU 201.

As described above, battery replacement function ECU 201 is configured to be capable of communicating with the battery replacement station, and executes the replacement procedure of main battery 11 in cooperation with the battery replacement station.

Here, battery replacement function ECU 201 according to the present embodiment is configured to be capable of switching between the locked state and the unlocked state of key cylinder 102 in cooperation with key-lock function ECU 202 as a safety function during the battery replacement.

To be more specific, when battery replacement switch 101 receives the battery replacement command, battery replacement function ECU 201 switches key cylinder 102 from the unlocked state to the locked state. Then, battery replacement function ECU 201 maintains the locked state of key cylinder

102 from the start to the end of the battery replacement procedure, and switches key cylinder 102 from the locked state to the unlocked state upon the end of the battery replacement procedure as a trigger.

Note that it is preferable that a timing at which battery replacement function ECU 201 switches key cylinder 102 from the unlocked state to the locked state is when the preparation for starting of the replacement of battery 11 is completed after battery replacement switch 101 receives the replacement command for battery 11. This is to lock key cylinder 102 after the user turns key cylinder 102 to the key-off position.

Further, it is preferable that a timing at which battery replacement function ECU 201 switches key cylinder 102 from the locked state to the unlocked state is when a notification indicating that the replacement of battery 11 has ended is received from the battery replacement station. This is to prevent a situation in which key cylinder 102 is switched from the locked state to the unlocked state before the replacement of battery 11 is completely ended.

Further, battery replacement function ECU 201 preferably informs the user that the battery replacement procedure is being executed, from the start of the battery replacement procedure to the end of the battery replacement procedure. This enables the user to recognize that the battery is being replaced.

An informing method by battery replacement function ECU 201 is optional, but examples thereof include a display section disposed on a battery replacement station side, a sound output section disposed on vehicle C side, and the like. For example, a display section (for example, a liquid crystal display) may be disposed at a position that is visible from driver seat Ca of vehicle C, in the battery replacement station, and battery replacement function ECU 201 may communicate with a system of the battery replacement station to cause the display section to display "Battery replacement procedure being executed." Alternatively, battery replacement function ECU 201 may, for example, cause the sound output section (for example, a speaker) of vehicle C to issue a sound output indicating "Battery replacement procedure in execution."

Figure 8:
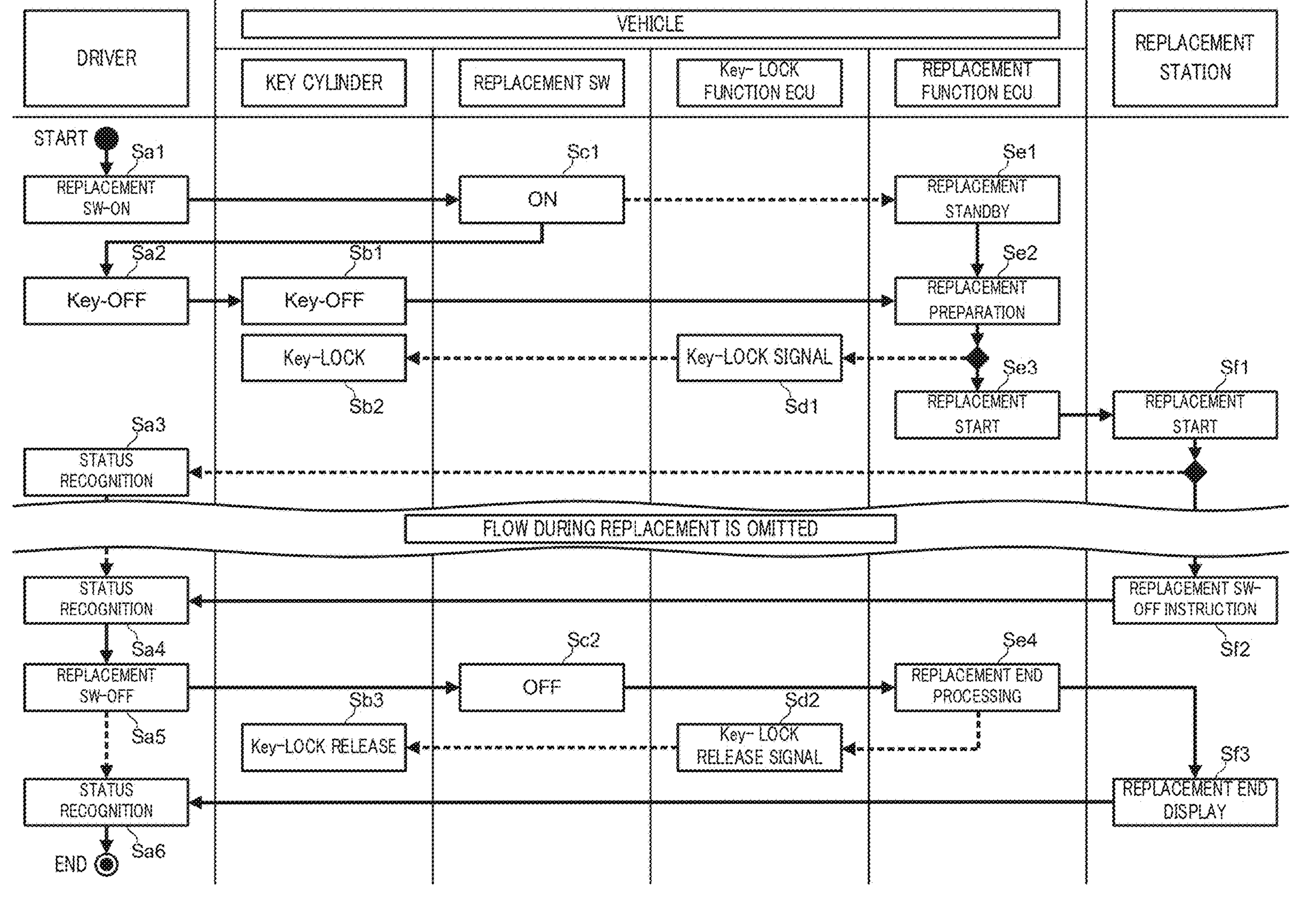
FIG. 8 is a sequence diagram illustrating an operation of the control system for the vehicle.

FIG. 8 is a sequence diagram illustrating an operation of control system Cu for vehicle C. FIG. 8 illustrates the following in a time series: "Operation by driver"; "Operation of key cylinder 102 of vehicle C"; "Operation of replacement SW (battery replacement switch 101) of vehicle C"; "Operation of key-lock function ECU 202 of vehicle C"; "Operation of battery replacement function ECU 201 of vehicle C"; and "Operation of battery replacement station."

First, the driver performs an operation of turning battery replacement switch 101 "ON" (step Sa1). Battery replacement switch 101 receives the "replacement SW-ON" operation by the driver and transmits a replacement command signal to battery replacement function ECU 201. At this time, battery replacement switch 101 may instruct, using the display section or the like, the driver to perform a key-off operation of vehicle C (step Sc1). Battery replacement function ECU 201 is brought into a standby state for the battery replacement in response to reception of the replacement command signal (step Sc1).

Next, the driver performs an operation of turning key cylinder 102 to the key-off position (step Sa2). Key cylinder 102, upon receiving the key-off operation by the driver, informs battery replacement function ECU 201 of this reception (step Sb1). Battery replacement function ECU 201, in response to the reception of the replacement command signal, starts the preparation for the battery replacement in each component of vehicle C and transmits a key-lock command signal to key-lock function ECU 202 (step Sc2). Key-lock function ECU 202, upon receiving the key-lock command signal, performs control to bring key cylinder 102 into the locked state (step Sd1). Thus, key cylinder 102 is switched from the unlocked state to the locked state (step Sb2). Then, battery replacement function ECU 201 starts the replacement procedure of the battery, such as releasing the locked state of the battery, and transmits a battery replacement start command to the battery replacement station side (step Se3).

The battery replacement station, upon receiving the battery replacement start command from battery replacement function ECU 201, starts an operation for replacing the battery of vehicle C (step Sf1). At this time, in order to enable the driver to recognize that the battery is being replaced, the battery replacement station may cause the display section, which is provided on the battery replacement station side, to display a display content indicating that the battery is being replaced.

The driver recognizes a status of the battery replacement procedure by viewing the display content (for example, "Battery replacement in progress") on the display section provided on the battery replacement station side (step Sa3).

Note that the replacement procedure itself of the battery of vehicle C is the same as in the current technique, and thus, the detailed description thereof will be omitted here (see, for example, PTL 1).

In response to the end of the battery replacement procedure, the battery replacement station instructs the driver to perform an operation of turning off battery replacement switch 101, using the display section or the like provided on the battery replacement station side (step Sf2).

The driver recognizes the status of the battery replacement procedure by viewing the display content on the display section provided on the battery replacement station side (for example, "Battery replacement completed, replacement SW-OFF") (step Sa4), and performs an operation of turning off battery replacement switch 101 (step Sa5). Battery replacement switch 101, upon receiving the "replacement SW-OFF" operation by the driver, transmits a replacement end processing command to battery replacement function ECU 201 (step Sc2).

Battery replacement function ECU 201, in response to the reception of the replacement end processing command, executes replacement end processing of the battery replacement, transmits a key unlock command signal to key-lock function ECU 202, and transmits the replacement end processing command to the battery replacement station (step Se4). Key-lock function ECU 202, upon receiving the key unlock command signal, performs control to bring key cylinder 102 into the unlocked state (step Sd2). Thus, key cylinder 102 is switched from the locked state to the unlocked state (step Sb3).

Then, in response to the end of the battery replacement procedure, the battery replacement station notifies the driver that the battery replacement procedure has ended, using the display section or the like provided on the battery replacement station side (step Sf3). The driver recognizes the status of the battery replacement procedure by viewing the display content (for example, "Replacement procedure of battery ended") on the display section provided on the battery replacement station side (step Sa6).

Control system Cu for vehicle C according to the present embodiment performs the battery replacement while preventing the driver from performing the activation operation of vehicle C during the battery replacement, with the series of operations described above.

Effects

As described above, control system Cu for electric vehicle C according to the present embodiment includes:

a key cylinder that functions as an ignition switch of the electric vehicle;

a key-lock control section (corresponding to "key-lock function ECU 202") that performs switching control between a locked state and an unlocked state of the key cylinder;

a battery replacement switch that receives a replacement command for the battery; and a battery replacement control section (corresponding to "battery replacement function ECU 201") that, during replacement of the battery, communicates with a battery replacement station outside the electric vehicle, controls a replacement procedure of the battery, and operates in cooperation with the key-lock control section, in which the battery replacement control section:

switches the key cylinder from the unlocked state to the locked state when the replacement command for the battery is received by the battery replacement switch, and maintains the locked state of the key cylinder from a start to an end of the replacement procedure of the battery, and switches the key cylinder from the locked state to the unlocked state, upon the end of the replacement procedure of the battery as a trigger.

Therefore, according to control system Cu for vehicle C of the present embodiment, it is possible to reliably prevent the vehicle activation operation (that is, an ignition switch ON operation in key cylinder 102) from being performed during the battery replacement.

Thus, it is possible to prevent a situation in which arc discharge occurs due to the high voltage applied to terminal portion 11*c* of main battery 11, causing a battery connector or other components on the vehicle C side to be welded.

Further, it is possible to prevent a situation in which unnecessary redoing of the battery replacement procedure occurs and an operation failure in the battery replacement machine of the battery replacement station is induced.

The present invention is not limited to the above embodiment and can be applied to various modified modes.

For example, in the above embodiment, vehicle frame Cf including slide rail base Cfa has been described as an example of vehicle C to be applied to the present invention, but any support mode of main battery 11 is possible for achieving vehicle C according to the present invention.

Further, in the above embodiment, as an example of lock mechanism 13 to be applied to the present invention, a mode has been described in which main battery 11 is locked by a pair of latches 13*a*. However, lock mechanism 13 used in the present invention is optional, and other lock mechanisms may be used.

Further, in the above embodiment, battery replacement function ECU 201 and key-lock function ECU 202, which are configured of microcontrollers, have been described as examples of the battery replacement control section and the key-lock control section to be applied to the present invention. However, the battery replacement control section and the key-lock control section to be applied to the present invention may be configured of a hardware circuit such as an Application Specific Integrated Circuit (ASIC) or a Field-Programmable Gate Array (FPGA) instead of a microcontroller. Further, these are not limited to being configured as separate units and may be configured integrally.

The specific examples of the present disclosure have been described in detail above, but these specific examples are mere examples and do not limit the appended claims. The technology described in the appended claims embraces various modifications and changes made in accordance with the specific examples described above.

The disclosure of Japanese Patent Application No. 2024-73937, filed on Apr. 30, 2024 including the specification, drawings and abstract, are incorporated herein by reference in its entirety.

INDUSTRIAL APPLICABILITY

According to a control system for an electric vehicle of the present invention, it is possible to prevent a situation in which a vehicle activation operation is performed during battery replacement.

REFERENCE SIGNS LIST

C Vehicle
Cu Control System
11 Main battery
12 Auxiliary battery
13 Lock mechanism
14 Drive motor
101 Battery replacement switch
102 Key cylinder
201 Battery replacement function ECU (battery replacement control section)
202 Key-lock function ECU (key-lock control section)

The invention claimed is:

1. A control system for an electric vehicle equipped with a battery, the control system comprising:

a key cylinder that functions as an ignition switch of the electric vehicle;

a key-lock control section that performs switching control between a locked state and an unlocked state of the key cylinder;

a battery replacement switch that receives a replacement command for the battery; and a battery replacement control section that, during replacement of the battery, communicates with a battery replacement station outside the electric vehicle, controls a replacement procedure of the battery, and operates in cooperation with the key-lock control section, wherein the battery replacement control section:

switches the key cylinder from the unlocked state to the locked state when the replacement command for the battery is received by the battery replacement switch, and maintains the locked state of the key cylinder from a start to an end of the replacement procedure of the battery, and switches the key cylinder from the locked state to the unlocked state, upon the end of the replacement procedure of the battery as a trigger.

2. The control system according to claim 1, wherein, when the replacement command for the battery is received by the battery replacement switch, the battery replacement control section switches the key cylinder from the unlocked state to the locked state at a timing at which preparation for starting the replacement of the battery is completed.

3. The control system according to claim 1, wherein the battery replacement control section switches the key cylinder from the locked state to the unlocked state at a timing at which a notification indicating that the replacement of the battery has ended is received from the battery replacement station.

4. The control system according to claim 1, wherein the battery replacement control section informs a user that the replacement procedure of the battery is being executed from the start to the end of the replacement procedure of the battery.

* * * * *